United States Patent
Madtson et al.

Patent Number: 6,061,298
Date of Patent: May 9, 2000

[54] METHOD OF AND SYSTEM FOR PROCESSING MULTICOMPONENT SEISMIC DATA

[75] Inventors: Eric Madtson; Jianchao Li, both of Houston; Mehmet Suat Altan; Xianhuai Zhu, both of Sugarland, all of Tex.

[73] Assignee: PGS Tensor, Inc., Houston, Tex.

[21] Appl. No.: 09/093,589

[22] Filed: Jun. 8, 1998

[51] Int. Cl.$^7$ ..................................................... G01V 1/00
[52] U.S. Cl. ............................ 367/21; 367/72; 367/74; 367/31
[58] Field of Search .................... 367/22, 31, 38, 367/56, 57, 61, 62, 74, 75, 59, 36, 37

[56] References Cited

U.S. PATENT DOCUMENTS

| | | | |
|---|---|---|---|
| 4,695,984 | 9/1987 | Paul | 367/36 |
| 4,766,574 | 8/1988 | Whitmore, Jr. et al. | 367/75 |
| 4,803,666 | 2/1989 | Alford | 367/36 |
| 4,903,244 | 2/1990 | Alford | 367/36 |
| 5,029,146 | 7/1991 | Alford | 367/75 |
| 5,343,441 | 8/1994 | Alford | 367/75 |
| 5,502,392 | 3/1996 | Lu et al. | 367/75 |
| 5,657,294 | 8/1997 | Zhang | 367/38 |

OTHER PUBLICATIONS

D.Corigan, J.P. DiSiena, J.E. Gaiser,1981, Three Component Vertical Seismic Profiles: orientation of Horizontal Components for Shear Wave Analysis. 51st Annual International Meeting, Society of Exploration Geophysicists, Expanded Abstracts, 1991–2011.

R.H.Tatham and M.D. McCormack, 1991, Multicomponent Seismology in Petroleum Exploration. Society of Exploration Geophysicists.

J.F. Arestad, R. Windels, and T.L. Davis,1996, Azimuthal Analysis of 3–D Shear Wave Data, Joffre Field Alberta, Canada. 66th Annual International Meeting, Society of Exploration Geophysicists, Expanded Abstracts, 1563–1566.

J.E. Gaiser, P.J. Fowler, and A.R.Jackson,1997, Challenges for 3–D Converted –Wave Processing. 67th Annual International Meeting, Society of Exploration Geophysicists, Expanded Abstracts, 1199–1202.

R.R.VanDok, J.E. Gaiser, A.R. Jackson, and H.B. Lynn ,1997, 3–D Converted Wave Processing: Wind River Basin Case History. 67th Annual International meeting, Society of Exploration Geophysicists, Expanded Abstracts, 1206–1209.

*Primary Examiner*—Christine Oda
*Assistant Examiner*—Anthony Jolly
*Attorney, Agent, or Firm*—Gordon T. Arnold

[57] ABSTRACT

Methods and systems are provided for orientation of multicomponent geophones, for rotating traces, and for correcting polarity differences between traces. According to an example embodiment, a receiver orientation angle is assigned, based on a determination of an angle between one or more horizontal components and one or more sources.

89 Claims, 6 Drawing Sheets

METHOD OF AND SYSTEM FOR PROCESSING MULTICOMPONENT SEISMIC DATA

BACKGROUND OF THE INVENTION

This invention relates to the field of seismic signal processing and more specifically to the processing issues involved in orientation of multi-component detectors (a.k.a. geophones).

In the area of seismic signal processing, there has been a desire to analyze both shear (S-wave) and pressure (P-wave) data. For example, it has been discovered that S-waves do not respond to some hydrocarbon structures in the manner that P-waves respond. P-waves may reflect strongly at structures that are both water-containing, and therefore not economic for drilling, and hydrocarbon-containing. S-waves, on the other hand, will reflect strongly at many of the same water-structures as P-waves, but they do not reflect strongly at many of the hydrocarbon-containing structures. Therefore, comparison of S-wave displays and P-wave displays of a given structure helps in making decisions regarding which structures should be drilled.

Further, some S-waves reflect differently at certain structures than other structures, which is another indication of rock properties in which an interpreter may be interested. Therefore, comparison of S-wave displays of different types and at different orientation angles is desired by interpreters. There are many such differences, which are known to those of skill in the art. See, e.g., J. P. DiSiena, J. E. Gaiser, and D. Corrigan, 1981, *Three-Component Vertical Seismic Profiles: orientation of Horizontal Components for Shear Wave Analysis.* $51^{st}$ Annual International Meeting, Society of Exploration Geophysicits, Expanded Abstracts, 1991–2011; R. H. Tatham and M. D. McCormack, 1991 *Mulitcomponent Seismology in Petroleum Exploration.* Society of Exploration Geophysicists; J. F. Arestad, R. Windels, and T. L. Davis, 1996, *Azimuthal Analysis of 3-D Shear Wave Data, Joffre Field Alberta, Canada.* $66^{th}$ Annual International Meeting, Society of Exploration Geophysicists, Expanded Abstracts, 1563–1566; J. E. Gaiser, P. J. Fowler, and A. R. Jackson, 1997, *Challenges for 3-D Converted-Wave Processing.* $67^{th}$ Annual International Meeting, Society of Exploration Geophysicists, Expanded Abstracts, 1199–1202; R. R. VanDok, J. E. Gaiser, A. R. Jackson, and H. B. Lynn, 1997, *3-D Converted Wave Processing: Wind River Basin Case History.* $67^{th}$ Annual International Meeting, Society of Exploration Geophysicists, Expanded Abstracts, 1206–1209; and references cited therein; all of which are incorporated herein by reference.

One of the ways of detecting the S-waves is with the use of so-called "multi-component" detectors. These geophones have sensors oriented to receive seismic signals from two horizontal directions (the in-line and the cross-line directions) and one vertical direction. Theoretically, a signal moving along the inline axis in the positive direction will generate a positive response on the in-line geophone component. The cross-line component will not respond at all to such a signal, nor will the vertical component. Likewise, a signal moving in the cross-line axis will generate a response at the cross-line geophone, but not on the other two components. Most signals, of course, travel at an angle to the cross-line and in-line directions, and they generate cross-line and in-line components whose amplitude is dependent upon the angle of incidence of the signal to the component. This is especially true in 3D (three dimensional) surveys where the source for some of the shots is not in-line with the receiving cable.

For example, referring to FIG. 1, a simplified example of a 3D multi-component survey is seen, in which there are several sources S1–S8 located around a single receiver R. As shown, the horizontal components H1 and H2 of the receiver R are oriented differently for each of the sources S1–S8. FIG. 1 is illustrative only. An actual 3D geometry is, of course, more complex. FIG. 2 shows example synthetic data recorded on the two horizontal components of the geophones of FIG. 1. Each source generates an exponentially tapered sine wave whose initial amplitude is one, and the direction of the particle motion is in the geophone-source plane. From these 16 traces, it is seen that the amplitudes and polarity vary from trace to trace. Therefore, the amplitudes and polarity must be adjusted before any further processing is applied. To make the proper adjustments, there must be knowledge of the orientation of the horizontal components of the geophones; and, there is a need for a simple and effective method for determining that orientation.

Interpreters normally require displays of data in at least two directions (the "radial" and, "transverse" directions). The data must be corrected for variations in the orientation of the horizontal components, since the amplitude of the data recorded from a particular component depends upon the angle of incidence of the signal to the component's direction of reception.

In positioning of the multi-component receiver cables in the survey, ideally, the in-line orientation would all be known, as would the cross-line orientation. This is somewhat practical in land surveys where care in the layout of the cable is taken. It is also somewhat possible in marine "dragged array" surveys, where the cable is dragged in a particular direction after deployment, giving the multi-component geophones substantially the same orientation. However, in ocean-bottom surveys ("OBS") in which the receiver cable is not dragged, and in vertical seismic surveys where the geophones are placed in a well bore, the orientation is more random, or perhaps even reversed, due to the twisting and coiling of the cable during deployment. Further, even where the orientation is generally known, such as in land and dragged array surveys, the orientation is not perfect, and as much as a ten percent difference can exist between any two receivers. There is a need, therefore, for determining the orientation of multi-component receivers. See, e.g., DiSiena, et al., *Three-Component Vertical Seismic Profiles: Orientation of Horizontal Components for Shear Wave Analysis*, 1981 Society of Exploration Geophysics Annual Meeting Papers (also incorporated herein by reference).

Earlier attempts at orientation determination include the so-called "hodogram" method described in the 1981 DiSiena paper cited above, in which the amplitude of the in-line component is plotted against the amplitude of the cross-line component. A line is then best-fit to the resulting set of points, which gives the direction of the components. However, this process has been found to be time consuming, and it fails to give the polarity of the waveform. As discussed above, where the orientation of the components is unknown, as in the non-dragged OBS cable or the VSP arrays, this is a serious drawback.

Another method of determining the angle is also described in the 1981 DiSiena paper, in which a mathematical rotation of the components is performed until the energy seen in one of the components is maximized. Again, such a process is time-consuming, expensive, and cannot give the polarity information needed.

Accordingly, there is a need for a simple, inexpensive, and fast method for determining the orientation of horizontal components of receivers.

SUMMARY OF THE INVENTION

It is an object of the present invention to provide a seismic signal processing method and system for use with multi-component data. According to one aspect of the invention, the orientation of the components is determined from the data in a statistical manner, which is faster and less expensive than earlier methods and corrects for polarity differences.

According to one aspect of the invention, a method is provided for determining the orientation of a multi-component detector using data from a multi-component seismic survey, wherein a first component of the multiple velocity component is oriented in a first direction and a second of the multiple velocity components is oriented in a second direction, the method comprising:

- determining the orientation angle of the first component with respect to a first source signal in the survey;
- determining the orientation angle of the first component with respect to a second source signal in the survey; and
- assigning a receiver orientation angle of the first component based upon said determining the orientation of the first component with respect to the first source and upon said determining the orientation of the first component with respect to the second source.

According to a more specific embodiment, said assigning comprises:

- adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined,
- statistically comparing the adjusted orientation angle and the angle of the first component with respect to the first source signal, and
- assigning a receiver orientation angle of the first component dependant upon said statistical comparing, wherein said statistically comparing comprises averaging of the adjusted orientation angle and the angle of the first component with respect to the first source signal.

According to an alternative more specific embodiment, an additional step is provided comprising: determining the orientation angle of the first component with respect to a third source signal in the survey, and said assigning a receiver orientation angle of the first component is further based upon said determining the orientation of the first component with respect to the third source. In such an embodiment, said assigning further comprises:

- adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined,
- adjusting the orientation of the orientation angle of the first component with respect to the third source signal by an amount equal to the difference in angle of a line between the first source and the receiver and a line between the third source and the receiver, wherein an adjusted orientation angle of the first component with respect to the third source is defined,
- statistically comparing the adjusted orientation angle of the first component with respect to the second source, the adjusted orientation angle of the first component with respect to the third source, and the angle of the first component with respect to the first source signal, and
- assigning a receiver orientation angle to the first component based upon said statistically comparing.

Here, said statistically comparing comprises averaging of the adjusted orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning the average.

In an alternative embodiment, said statistically comparing comprises taking the mean of the adjusted orientation angle of the first component with respect to the second source, the adjusted orientation angle of the first component with respect to the third source, and the angle of the first component with respect to the first source signal, and said assigning a receiver orientation angle to the first component based upon said; statistically comparing comprises assigning the mean.

In still a further alternative embodiment, said statistically comparing comprises determining a least squares fit of the orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning the least squares fit.

In an even further alternative embodiment, said statistically comparing comprises determining a statistical distribution of the orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning a statistically significant value of the statistical distribution, wherein said statistical distribution comprises a Gaussian distribution.

In yet another more specific embodiment, said determining the orientation angle of the first component with respect to a first source comprises application of a hodogram to data points taken from the first component; while, in an alternative embodiment, said determining the orientation angle of the first component with respect to a first source comprises:

- determining an orientation angle at which the sum of the energy detected at the first component and the energy detected at the second component is at a maximum, and
- assigning an orientation angle of the first component dependant upon the determination of the orientation angle at which the sum is at a maximum.

In still another embodiment, said determining an orientation angle at which the sum of the energy detected at the first component and the energy detected at the second component is at a maximum comprises:

- sampling an event in a data trace from the first component;
- sampling the event in a data trace from the second component;
- changing the sample in the data trace from the first component based upon a first sample angle of rotation, wherein a first angle-adjusted sample of the event from the data trace from the first component is defined;

changing the sample in the data trace from the second component based upon a first sample angle of rotation, wherein a first angle-adjusted sample of the event from the data trace from the second component is defined;

adding the first angle-adjusted sample of the event from the data traces from the first and the second components, wherein a sample energy value is defined for the first sample angle of rotation;

repeating said sampling, changing and adding steps for a plurality of samples of the event from the first and the second components, wherein a set of sample energy values are defined for a plurality of samples of the event;

adding the set of sample energy values, wherein an energy value for the event at the first sample angle of rotation;

repeating said sampling, changing, adding, and repeating steps for a plurality of sample angles of rotation, wherein a set of energy values is defined for a set of sample angles; and determining the sampling angle corresponding to the highest energy value of the set of energy values.

In still a more specific example, said determining the sample angle corresponding to the highest energy value of the set of energy values comprises determination of the point at which the derivative of the energy with respect to the angle reaches zero; or, alternatively, said determining the sample angle corresponding to the highest energy value of the set of energy values comprises sorting the set of energy values, wherein a highest energy value is defined and picking the angle associated with the highest energy value.

According to another aspect of the present invention, a method of processing seismic data collected with a plurality of multi-component detectors is provided comprising:

determining the orientation angle of the first component of a first multi-component detector with respect to a first source signal in the survey;

determining the orientation angle of the first component with respect to a second source signal in the survey;

assigning a receiver orientation angle of the first component based upon said determining the orientation of the first component with respect to the first source and upon said determining the orientation of the first component with respect to the second source;

rotating traces from the first component based on said assigning a receiver orientation angle, wherein a first set of rotated traces are defined; and assigning a uniform polarity to the first set of rotated traces.

In a more specific example embodiment, said assigning a receiver orientation angle of the first component comprises:

adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined, statistically comparing the adjusted orientation angle and the angle of the first component with respect to the first source signal, and assigning a receiver orientation angle of the first component dependant upon said statistical comparing, wherein said statistically comparing comprises averaging of the adjusted orientation angle and the angle of the first component with respect to the first source signal.

In another more specific example, a further step is provided comprising determining the orientation angle of the first component with respect to a third source signal in the survey, and wherein said assigning a receiver orientation angle of the first component is further based upon said determining the orientation of the first component with respect to the third source.

In still a further example, said assigning a receiver orientation angle of the first component further comprises:

adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined, adjusting the orientation of the orientation angle of the first component with respect to the third source signal by an amount equal to the difference in angle of a line between the first source and the receiver and a line between the third source and the receiver, wherein an adjusted orientation angle of the first component with respect to the third source is defined, statistically comparing the adjusted orientation angle of the first component with respect to the second source, the adjusted orientation angle of the first component with respect to the third source, and the angle of the first component with respect to the first source signal, and assigning a receiver orientation angle to the first component based upon said statistically comparing.

In our embodiment, said statistically comparing comprises averaging of the adjusted orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning the average.

In another embodiment, said statistically comparing comprises taking the mean of the adjusted orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning the mean.

In still a further embodiment, said statistically comparing comprises determining a least squares fit of the orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning the least squares fit.

While, in yet another embodiment, said statistically comparing comprises determining a statistical distribution of the orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning a statistically significant value of the statistical distribution, and said statistical distribution comprises a Gaussian distribution.

In other embodiments, said determining the orientation angle of the first component with respect to a first source comprises alternatively: application of a hodogram to data points taken from the first component, or:

determining an orientation angle at which the sum of the energy detected at the first component and the energy detected at the second component is at a maximum, and assigning an orientation angle of the first component dependant upon the determination of the orientation angle at which the sum is at a maximum.

In still another embodiment, said determining an orientation angle at which the sum of the energy detected at the first component and the energy detected at the second component is at a maximum comprises:

sampling an event in a data trace from the first component;

sampling the event in a data trace from the second component;

changing the sample in the data trace from the first component based upon a first sample angle of rotation, wherein a first angle-adjusted sample of the event from the data trace from the first component is defined;

changing the sample in the data trace from the second component based upon a first sample angle of rotation, wherein a first angle-adjusted sample of the event from the data trace from the second component is defined;

adding the first angle-adjusted sample of the event from the data traces from the first and the second components, wherein a sample energy value is defined for the first sample angle of rotation;

repeating said sampling, changing and adding steps for a plurality of samples of the event from the first and the second components, wherein a set of sample energy values are defined for a plurality of samples of the event;

adding the set of sample energy values, wherein an energy value for the event at the first sample angle of rotation;

repeating said sampling, changing, adding, and repeating steps for a plurality of sample angles of rotation, wherein a set of energy values is defined for a set of sample angles; and determining the sampling angle corresponding to the highest energy value of the set of energy values.

In other more specific embodiments, said determining the sample angle corresponding to the highest energy value of the set of energy values comprises determination of the point at which the derivative of the energy with respect to the angle reaches zero, or sorting the set of energy values, wherein a highest energy value is defined and picking the angle associated with the highest energy value.

In yet another embodiment, said determining an orientation angle at which the sum of the energy detected at the first component and the energy detected at the second component is at a maximum comprises:

sampling an event in a data trace from the first component, wherein a first time sample value of the event from the first component is defined;

sampling the event in a data trace from the second component, wherein a first time sample value of the event from the second component is defined;

multiplying the first and the second time sample values, wherein a product of the first time sample values of the event from the first and the second component is defined;

squaring the first time sample value of the event from the first component, wherein a squared first time sample value of the event from the first component is defined;

squaring the first time sample value of the event from the second component, wherein a squared first time sample value of the event from the second component is defined;

subtracting the squared first time sample value of the event from the second component from the squared first time sample value of the event from the first component, wherein a difference of squares sample value of the event is defined;

repeating said sampling, multiplying, and subtracting steps for a set of time samples of the event, wherein a set of difference of squares sample values of the event is defined, and a set of product of the first time sample values of the event from the first and the second component is defined;

dividing twice the sum of the set of product of the first time sample values of the event from the first and the second component by the sum of the set of difference of squares sample values of the event, wherein an angle value is defined; and dividing the arctangent of the angle value by two, wherein the angle at which the energy is at a maximum is defined.

In some such embodiments, said rotating traces from the first component based on said assigning a receiver orientation angle, comprises:

multiplying a trace from the first component by the cosine of the orientation angle, wherein a first product is defined;

multiplying a trace from a second component of the receiver by the sine of the orientation angle, wherein a second product is defined; and adding the first and the second product, wherein a rotated trace is defined.

In still further embodiments, there is further provided:

rotating traces from a second component based on said assigning a receiver orientation angle, wherein a second set of rotated traces are defined; and assigning a uniform polarity to second set of rotated traces, wherein:

said rotating traces from the first component based on said assigning a receiver orientation angle comprises:

multiplying a trace from the first component by the cosine of the orientation angle, wherein a first product is defined, multiplying a trace from the second component of the receiver by the sine of the orientation angle, wherein a second product is defined, and adding the first and the second product, wherein a rotated first trace is defined; and said rotating traces from the second component based on said assigning a receiver orientation angle comprises:

multiplying a trace from the first component by the sine of the orientation angle, wherein a third product is defined, multiplying a trace from the second component of the receiver by the cosine of the orientation angle, wherein a fourth product is defined, and subtracting the third product from the fourth product, wherein a rotated second trace is defined.

In an even further embodiment, said assigning a uniform polarity to the rotated set of traces comprises:

comparing the polarity of a first trace of the first set of rotated traces at an event to the polarity of a second trace of the first set of rotated traces at the event, and changing the polarity of the event in the second trace of the first set of rotated traces is different from the polarity of the event in the first trace of the first set of rotated traces, wherein said first trace of the first set of rotated traces is adjacent said second trace of the first set of rotated traces at the event, or wherein said event in said first trace comprises a direct arrival.

In an even further embodiment, said comparing the polarity of a first trace of the first set of rotated traces at an event to the polarity of a second trace of the first set of rotated traces at the event comprises:

sampling an event window in the first trace, wherein a first trace sample value is defined, sampling an event window in the first trace, wherein a second trace sample value is defined, and multiplying the first trace sample by the second trace sample; and said changing occurs if the result of said multiplying is less than zero.

In still another embodiment, said comparing the polarity of a first trace of the first set of rotated traces at an event to the polarity of a second trace of the first set of rotated traces at the event comprises:

sampling an event window in the first trace, wherein a set of first trace sample values is defined, sampling an event window in the first trace, wherein a set of second trace sample values is defined, the members of the set of second trace sample values corresponding to the members of the set of first trace sample values, and multiplying corresponding first trace sample values and second trace sample values, wherein a set of products of corresponding first and second trace sample values is defined; and said changing occurs if more of the products of the set of products are negative than positive, wherein said first trace and said second trace are from receivers in a common cable, or wherein said first trace and said second trace are from receivers in different cables.

According to another aspect of the invention, a system for determining the orientation of a multi-component detector using data from a multi-component seismic survey, is provided, wherein a first component of the multiple velocity component is oriented in a first direction and a second of the multiple velocity components is oriented in a second direction, the system comprising:

means for determining the orientation angle of the first component with respect to a first source signal in the survey;

means for determining the orientation angle of the first component with respect to a second source signal in the survey; and means for assigning a receiver orientation angle of the first component based upon said determining the orientation of the first component with respect to the first source and upon said determining the orientation of the first component with respect to the second source.

Further system components and embodiments will be understood from a review of the detailed description of embodiments of the invention.

According to still another aspect of the invention, a system of processing seismic data collected with a plurality of multi-component detectors is provided comprising:

means for determining the orientation angle of the first component of a first multi-component detector with respect to a first source signal in the survey;

means for determining the orientation angle of the first component with respect to a second source signal in the survey;

means for assigning a receiver orientation angle of the first component based upon said determining the orientation of the first component with respect to the first source and upon said determining the orientation of the first component with respect to the second source;

means for rotating traces from the first component based on said assigning a receiver orientation angle, wherein a first set of rotated traces are defined; and means for assigning a uniform polarity to the first set of rotated traces.

Again, further embodiments and components will be understood from a review of the following description.

According to still a further aspect of the invention, a system of processing seismic data collected with a plurality of multi-component detectors is provided comprising:

means for determining the orientation angle of the first component of a first multi-component detector with respect to a first source signal in the survey;

means for determining the orientation angle of the first component with respect to a second source signal in the survey;

means for assigning a receiver orientation angle of the first component based upon said determining the orientation of the first component with respect to the first source and upon said determining the orientation of the first component with respect to the second source;

means for rotating traces from the first component based on said assigning a receiver orientation angle, wherein a first set of rotated traces are defined; and means for assigning a uniform polarity to the first set of rotated traces;

means for determining the orientation angle of the first component with respect to a third source signal in the survey, and wherein said assigning a receiver orientation angle of the first component is further based upon said determining the orientation of the first component with respect to the third source;

wherein said means for assigning a receiver orientation angle of the first component further comprises:

means for adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined, means for adjusting the orientation of the orientation angle of the first component with respect to the third source signal by an amount equal to the difference in angle of a line between the first source and the receiver and a line between the third source and the receiver, wherein an adjusted orientation angle of the first component with respect to the third source is defined, means for statistically comparing the adjusted orientation angle of the first component with respect to the second source, the adjusted orientation angle of the first component with respect to the third source, and the angle of the first component with respect to the first source signal, and means for assigning a receiver orientation angle to the first component based upon said statistically comparing;

wherein said means for statistically comparing comprises means for determining a statistical distribution of the orientation angle of the first component with respect to:

the second source, the adjusted orientation angle of the first component with respect to the third source, and the angle of the first component with respect to the first source signal; and wherein said means for assigning a receiver orientation angle to the first component based upon said statistically comparing comprises assigning a statistically significant value of the statistical distribution;

and further comprising:

means for rotating traces from a second component based on said assigning a receiver orientation angle, wherein a second set of rotated traces are defined;

means for assigning a uniform polarity to second set of rotated traces; wherein said means for rotating traces from the first component based on said assigning a receiver orientation angle comprises:

means for multiplying a trace from the first component by the cosine of the orientation angle, wherein a first product is defined, means for multiplying a trace from the second component of the receiver by the sine of the orientation angle, wherein a second product is defined, and means for adding the first and the second product, wherein a rotated first trace is defined; and said means for rotating traces from the second component based on said assigning a receiver orientation angle comprises:

means for multiplying a trace from the first component by the sine of the orientation angle, wherein a third product is defined, means for multiplying a trace from the second component of the receiver by the cosine of the orientation angle, wherein a fourth product is defined, and means for subtracting the third product from the fourth product, wherein a rotated second trace is defined and wherein said means for assigning a uniform polarity to the rotated set of traces comprises:

means for comparing the polarity of a first trace of the first set of rotated traces at an event to the polarity of a second trace of the first set of rotated traces at the event means for changing the polarity of the event in the second trace of the first set of rotated traces is different from the polarity of the event in the first trace of the first set of rotated traces.

DESCRIPTION OF THE DRAWINGS

For a more complete understanding of the present invention and for further advantages thereof, reference is made to the following Detailed Description taken in conjunction with the accompanying drawings, in which.

Figure 1:
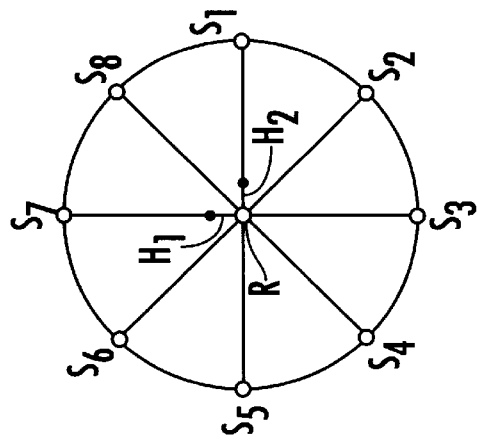
FIG. 1 is a representational view of an example spread useful in accordance with the present invention.

It is to be noted, however, that the appended drawings illustrate only typical embodiments of this invention and are therefore not to be considered limiting of its scope, for the invention may admit to other equally effective embodiments.

DETAILED DESCRIPTION OF EXAMPLE EMBODIMENTS OF THE INVENTION

According to various embodiment of the invention, a statistical method is used to determine the receiver orientation angle. In one such embodiment, referring now to FIG. 1, a maximum energy method is used to determine the actual angle of one of the horizontal components with respect to a line between the source and the receiver. In one specific example that is useful in an embodiment of the invention, the data (FIG. 2) for H1 and H2 as a result of the activation of source S1 (FIG. 1) are sampled in a window. The sample window includes an event that is presumed to be representative of a signal. In practice, the direct arrival from S1 is an event that has been found to be useful. However, a signal from a calibration shot is used in alternative embodiments of the invention, and the orientation angle determined with respect to a line between the receiver and the location of the calibration shot. Other events are used according to still further embodiments (for example, other "first break" events). In any case, the event used should have substantially uniform behavior for each of the traces sampled.

In the example embodiment of the direct arrival, about a 100 ms window is useful, sampled at between about 2 ms and 4 ms. The amplitude within the sample for both H1 and H2 is determined by any of the processes known to those of skill in the art for determination of amplitude within a sample. The amplitude of H1 is multiplied by $\cos(\theta)$, where ($\theta$) represents an angle of orientation of the receiver. In one example embodiment, $\theta$ is rotated through equal samples, and the calculation performed again. At the angle $\theta m$ where the total energy for H1 and H2 is at a maximum, the angle of orientation between a line between the receiver and the source and H1 is found. To find this angle, H2 is multiplied by $\sin(\theta)$, and the energy at a particular angle $E(\theta)$ is determined by taking the sum over the time sample of $H1(t)\cos(\theta)+H2\sin(\theta)$:

$$E(\theta)=\Sigma_t(H1(t) \cos (\theta)+H2 \sin (\theta))$$

The energy is at a maximum where the partial derivative with respect to $\theta$ is zero:

$$\partial E/\partial\theta=0$$

Therefore, the angle of orientation at which $E(\theta)$ is at a maximum is:

$$\theta m=(\tfrac{1}{2})\arctan(2\Sigma_t(H1(t)H2(t))/\Sigma_t(H1^2(t)-H2^2(t)))$$

$\theta m$ is, therefore, the angle between the actual orientation of the horizontal component H1 and a line between the receiver and source. The source and receiver locations are known, and, therefore, though simple trigonometry, the actual orientation angle $\theta r$ of the geophone component is determined.

Since the determination of the θm for any single source-receiver pair is dependent upon signal-to-noise ratio, and sources of error, according to this aspect of the present invention multiple traces for the same receiver R (for example from sources S1–S8 of FIG. 1) are used. The actual orientation for the receiver R's component H1 is determined statistically from the resulting set of measurements.

Such statistical determination comprises, according to some example embodiments, averaging the angles θm1–θm8 (after adjustment to take into account the relative position of sources S1–S8), taking the mean of the data, or fitting the data in a least squares method. However, simple average, mean, or least-squares methods, are prone to error from bad data. Accordingly, in another embodiment of the invention, the θm results are placed in a Gaussian distribution, or other distribution, in order to remove anomalous results. Examples of other distributions that are useful according to the present invention include: exponentially weighted distributions, triangle distributions, and other distributions that will occur to those of skill in the art.

The number of sources used in the determination of the orientation angle θr for a particular receiver R is determined, according to another aspect of the invention, by the geometry of the survey. For some receivers, there will be more sources at an appropriate distance than with others. Further, there will be a more even distribution of sources around some receivers than others. It is desirable, therefore, according to one embodiment of the invention, to use between two and twelve sources. Two is the minimum to allow for statistical sampling techniques (although in some embodiments, without statistical sampling, only one is used), and over twelve there is a point of diminishing returns in the tradeoff between accuracy and cost. In most surveys a number between 4 and 8 is best.

In determining the distance between the sources used and the receiver, according to one embodiment, sources intermediate the nearest offset and the farthest offset are used, and the direct arrival is the event around which a sample window is placed. In the intermediate offsets, the direct arrival can be separated from other events (e.g. refractions, early reflections, and ghosts) according to methods known to those of skill in the art (for example, tau-p transforms, f-k, and velocity filter).

A particular advantage of this aspect of the present invention is that the orientation angle determined by the above method is accurate for all traces from the same receiver R. Therefore, according to another aspect of the invention, having determined the orientation angle θr from a limited number of traces from receiver R, the entire data set for receiver R is processed with one θr, according to another aspect of the present invention.

In order to produce a display of data along a single plane from differently oriented horizontal components, the traces received from a particular receiver must be modified to represent the signals that would have been recorded if the particular component (H1 or H2) were oriented along that particular plane. For example, as mentioned above, many interpreters desire to see a display of data in the "radial" plane including a line between the source and receiver. At the same time, a display orthogonal to the radial plane is also desired. Therefore, to produce those displays, the data for all traces from a particular receiver R, for all the time of the recording, is multiplied by a rotation function, dependant upon the orientation angle θr. According to one embodiment, that rotation comprises application of the following functions:

$H1'(t) = H1(t) \cos(\theta r) + H2(t) \sin(\theta r)$ $H2'(t) = -H1(t) \sin(\theta r) + H2(t) \cos(\theta r)$ As a result of the rotation, a display in the radial direction should show reflections corresponding to the behavior of shear waves in the surveyed geology, while a display in the orthogonal direction should show noise. In the event that the orthogonal survey appears to show structure, there is an indication that anisotropic formations exist at the earliest point in time where the structure first appears.

According to a further embodiment of the present invention, rotated data, whether by the process described above or some other process, is corrected to remove polarity problems. According to this aspect of the invention, the direct arrival is again sampled in a first receiver trace in a first receiver line and in a second receiver trace in the first receiver line. If the polarity of the direct arrival is different for the two traces, then the polarity of one of the traces is changed (for example, by multiplication by –1). The second trace of the first receiver line is then compared to the third trace of the first receiver line, and a modification is performed under the same conditions as described for the first two traces. The method is repeated for each receiver in the line.

According to yet a further embodiment of the invention, the first receiver trace of the first receiver line is compared to a first receiver trace of a second receiver line, and a modification is performed under the same conditions as described for the first two receiver traces of the first receiver line. It has been found desirable to compare traces from receivers close together, and preferably adjacent, to avoid offset-introduced errors from harming the polarity processing. As mentioned before, in some embodiments, the direct arrival is the portion of the trace in which the polarity is checked. However, in some embodiments, another event is checked, dependent upon which event is determined to be the most accurately detected. Further, in other embodiments, the comparison between a first trace and a second trace will be of one event, and the comparison of the second trace and a third trace will be of another event, again, dependent upon the consistency of the events in the data.

According to another embodiment, the polarity of an entire common receiver gather is modified, dependent upon the comparison of the polarity between a single event on two traces from different receiver gathers. For example, if the polarity of the direct arrival in a trace from receiver R1 is different from the polarity of the direct arrival in a trace from an adjacent receiver R2. Then, according to this embodiment, the entire set of traces, and all of each of the entire set of traces, not just the direct arrival, is multiplied by –1, without further comparison. Such processing increases the speed of processing greatly.

According to still a further embodiment of the present invention, a process of comparing the polarity between two events is provided, in which the window of an event on a first trace (for example 100 ms at the direct arrival) is sampled (for example at about 4 ms intervals), and the same window on a second trace is sampled at the same rate. The corresponding sample values are multiplied, and whether the result is a positive or negative number is recorded. This is performed for the entire window. The number of positive results is compared to the number of negative results. If there are more negative results than positive, then the second trace is multiplied by –1.

According to still a further embodiment of the invention, a cross-correlation between the two samples of the two traces is performed. The second trace is modified if the maximum of the cross-correlation result is negative.

According to still a further embodiment, each of the samples of the window of the first trace is added to the other samples of the window of the first trace. Likewise, each of the samples of the window of the second trace is added to the other samples of the window of the second trace. The sign of the results of these additions is compared. The second trace is multiplied by −1 in the event that the sign of the result of the additions is not the same.

Figure 2:
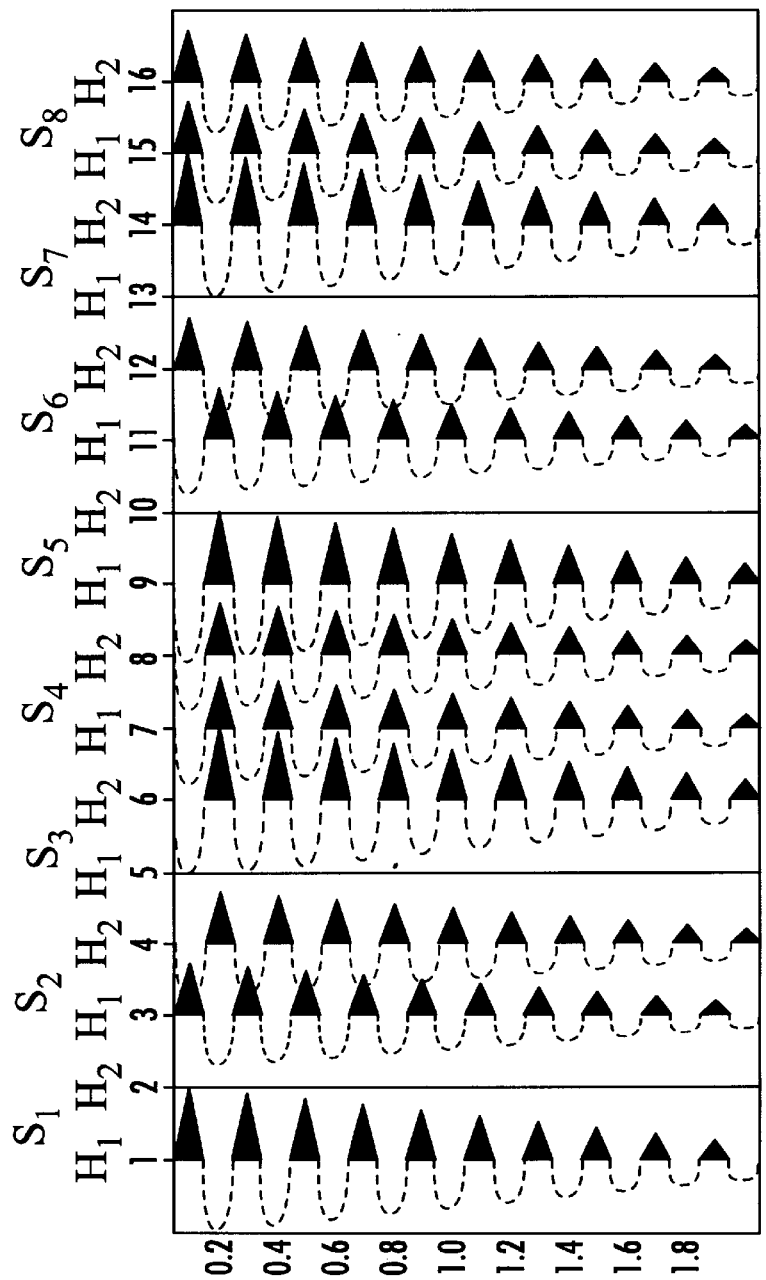
FIG. 2 is a plot of example data from the spread of FIG. 1.
Figure 3:
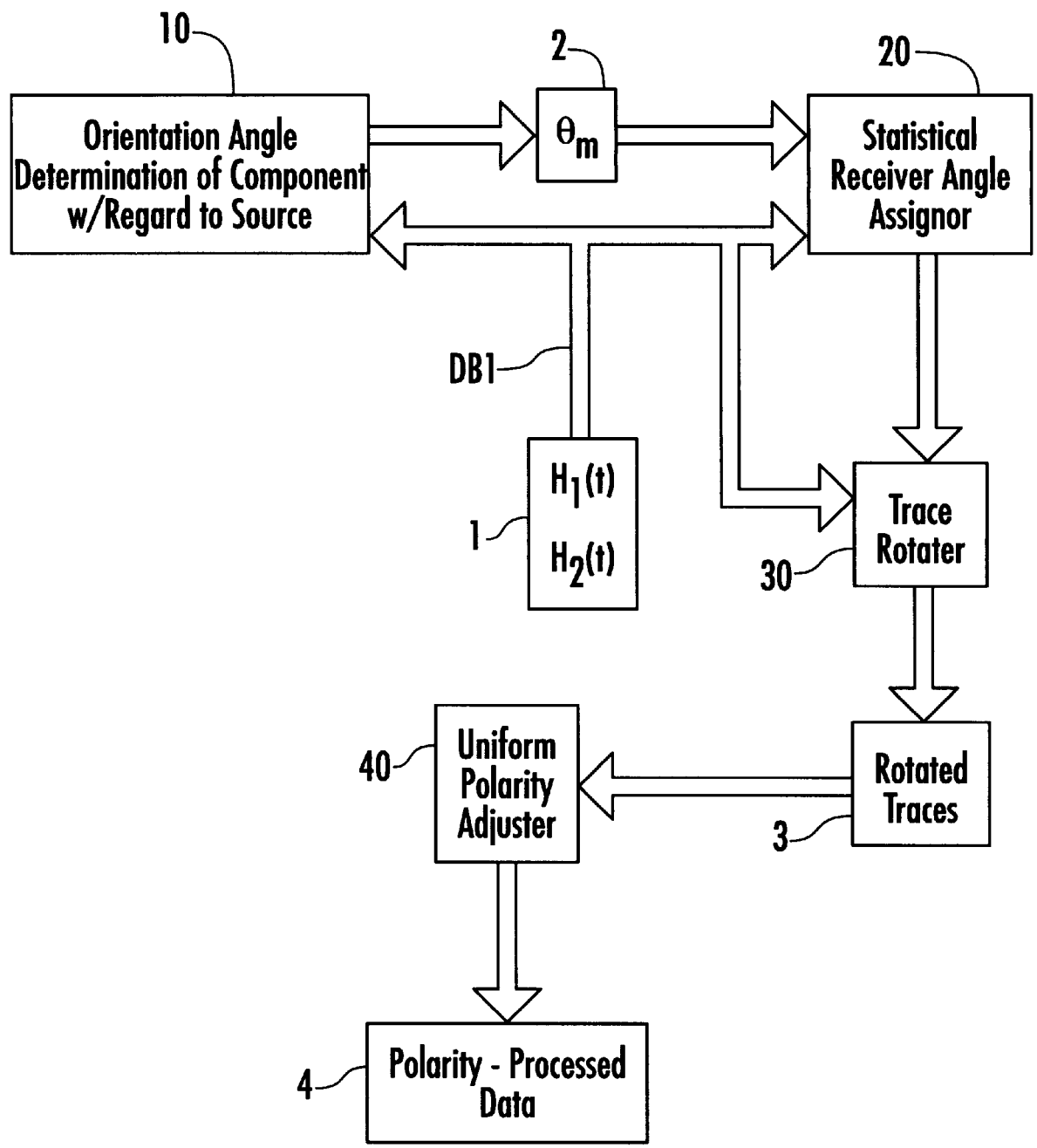
FIG. 3 is a block diagram of an example embodiment of the present invention.

Referring now to FIG. 3, an embodiment of the invention is seen in which a system is provided for processing seismic data that has been collected with a plurality of multi-component detectors R (FIG. 1). It should be noted that the present system invention includes components, which are, in some embodiments, software, and, in other embodiments, the components comprise hardware. No distinction is made here, since those of ordinary skill in the art will be able to implement the system of the present invention in either (upon review of the following disclosure of example embodiments of the system invention). Further, the following system is illustrative, only. In many places a parallel architecture is seen. However, many components are combined in alternative embodiments of the invention. For example, there are multiple division components shown in the example below. However, in an alternative embodiment, a single division component is used, and the inputs changed. Further modifications will occur to those of skill in the art upon review of the example embodiments below.

According to one embodiment, data from components H1(t) and H2(t) is stored in a memory 1 and is accessible through data bus DB1. The data is used by the orientation angle determination component 10, which generates an angle θm, which is stored in memory 2. A receiver angle assignor 20 uses the data of memory 2 in connection with the seismic data to statistically determine the true angle θr of each receiver R. Next, trace rotator 30 applies a rotation algorithm to the traces of the receiver R, and stores the rotated traces in memory 3. Finally, the polarity of the rotated traces from memory 3 are compared and adjusted by the Uniform Polarity Adjuster 40, and polarity-processed data are stored in memory 4.

In an alternative embodiment of the invention, memory 4 and memory 3 are the same memory, and uniform polarity adjuster 40 writes over traces in memory 3 after changing their polarity, as will be seen in a specific example embodiment, below.

Figure 4:
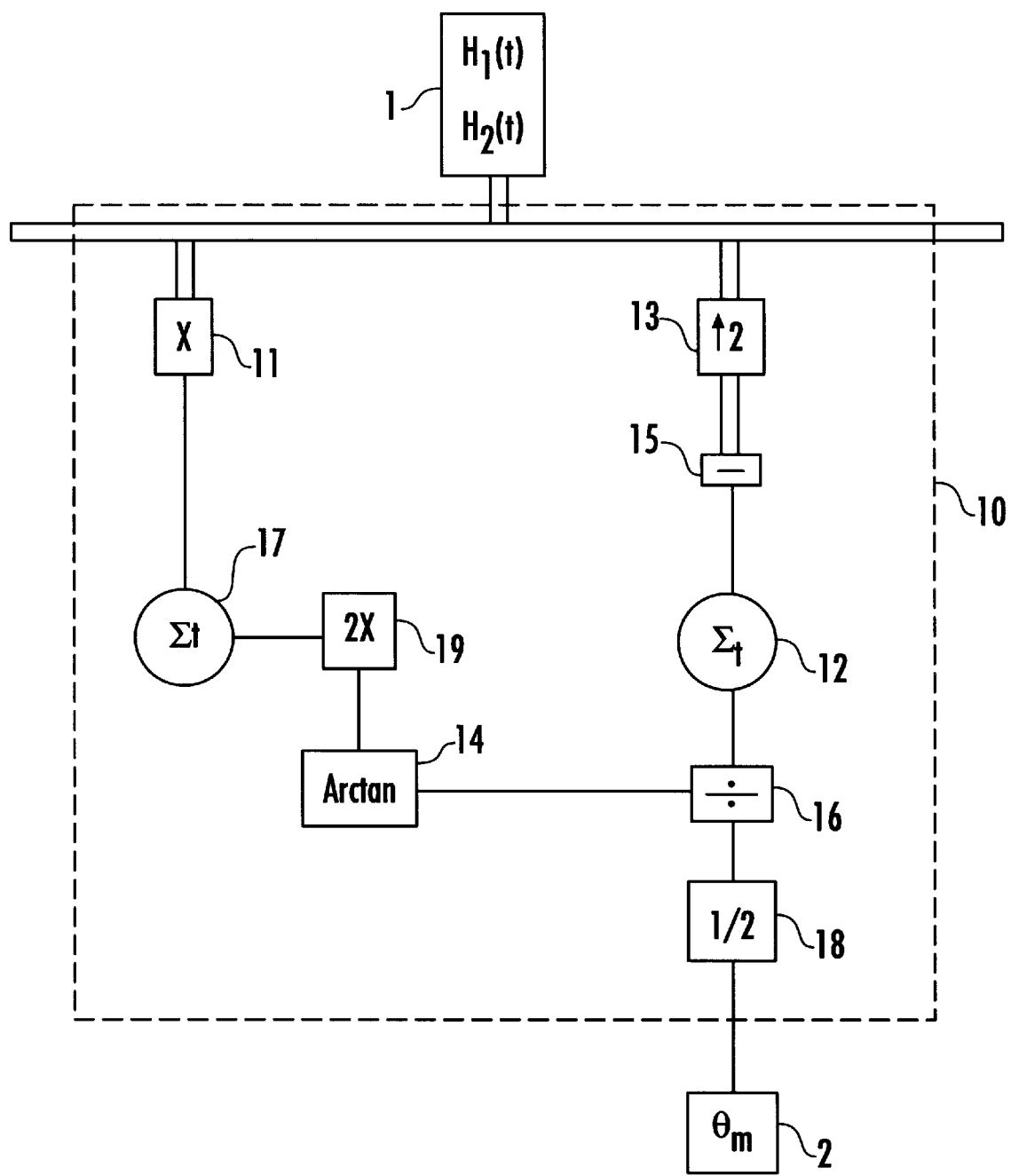
FIG. 4 is a block diagram of an example embodiment of the present invention.

Referring now to FIG. 4, an example of orientation angle determination component 10 is seen in which time sample portions of traces H1(t) and H2(t) from memory I are multiplied together by multiplier 11 (H1(t)×H2(t)). Each trace H1(1) and H2(t) is also squared by squaring component 13. The squared traces $H1^2(t)$ and $H2^2(t)$ are subtracted ($H1^2(t)-H2^2(t)$) by subtractor 15. The multiplied samples and squared samples are summed over time by summers 12 and 17. The sum resulting from summer 17 of the multiplied samples is then doubled by doubler. 19, and the result from doubler 19 is divided by the sum from summer 12 by divider 16. The arctangent of the result from divider 16 is taken by arctangent component 14. The result of arctangent component 14 is then halved by divider 18. The result of divider 18 is the angle θm of horizontal component H1 of receiver R with respect to a line between receiver R and a source (e.g. S1 of FIG. 1).

Figure 5:
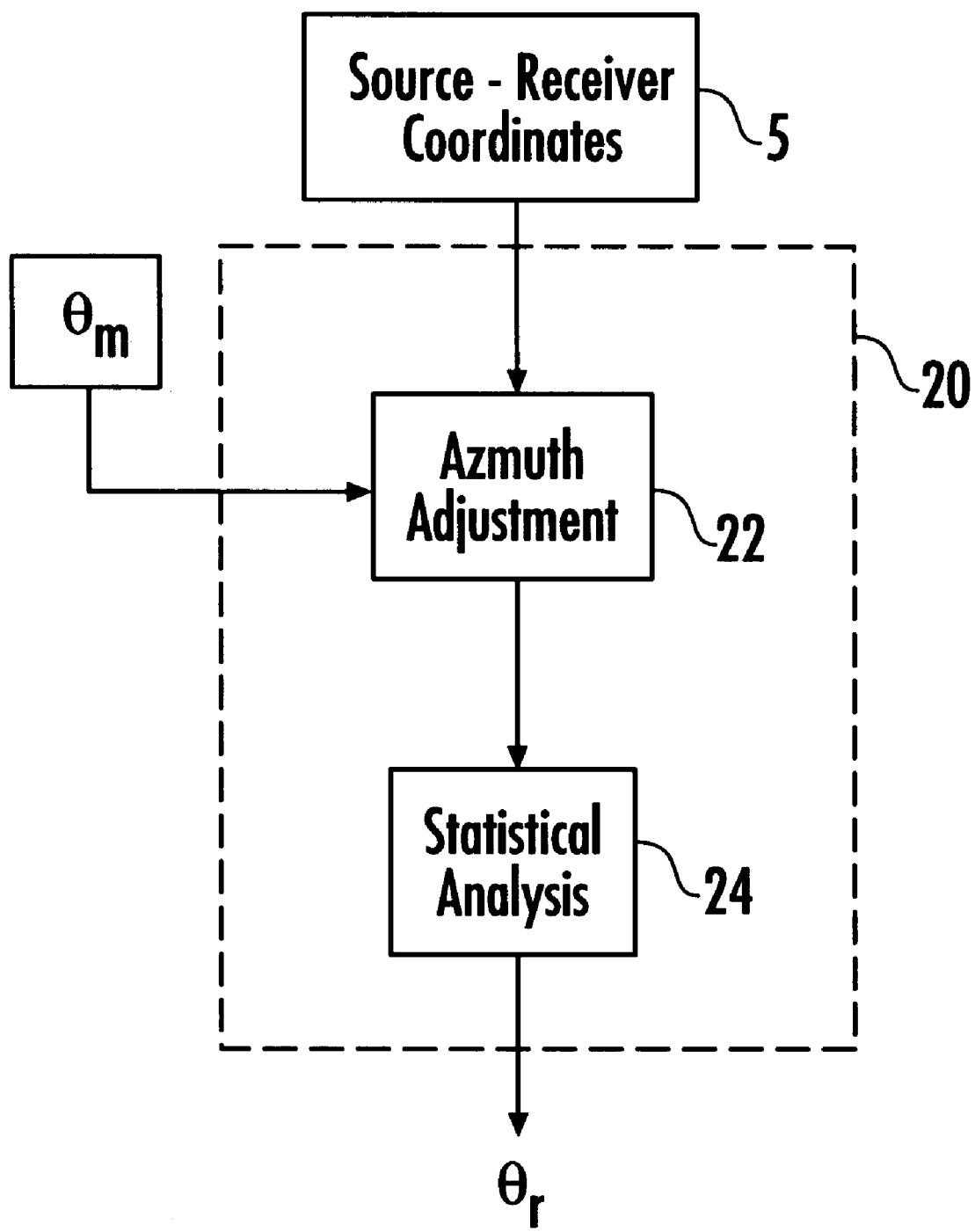
FIG. 5 is a block diagram of an example embodiment of the present invention.

Referring now to FIG. 5, an embodiment of receiver angle assignor 20 is seen, in which an azimuth adjustment component 22, responsive to data of the source-receiver coordinates (stored in memory 5) adjusts the θm(s) of each source to a uniform orientation. Next, statistical analyzer 24 determines a single θr for the receiver, based on the statistical analysis, as described above.

Figure 6:
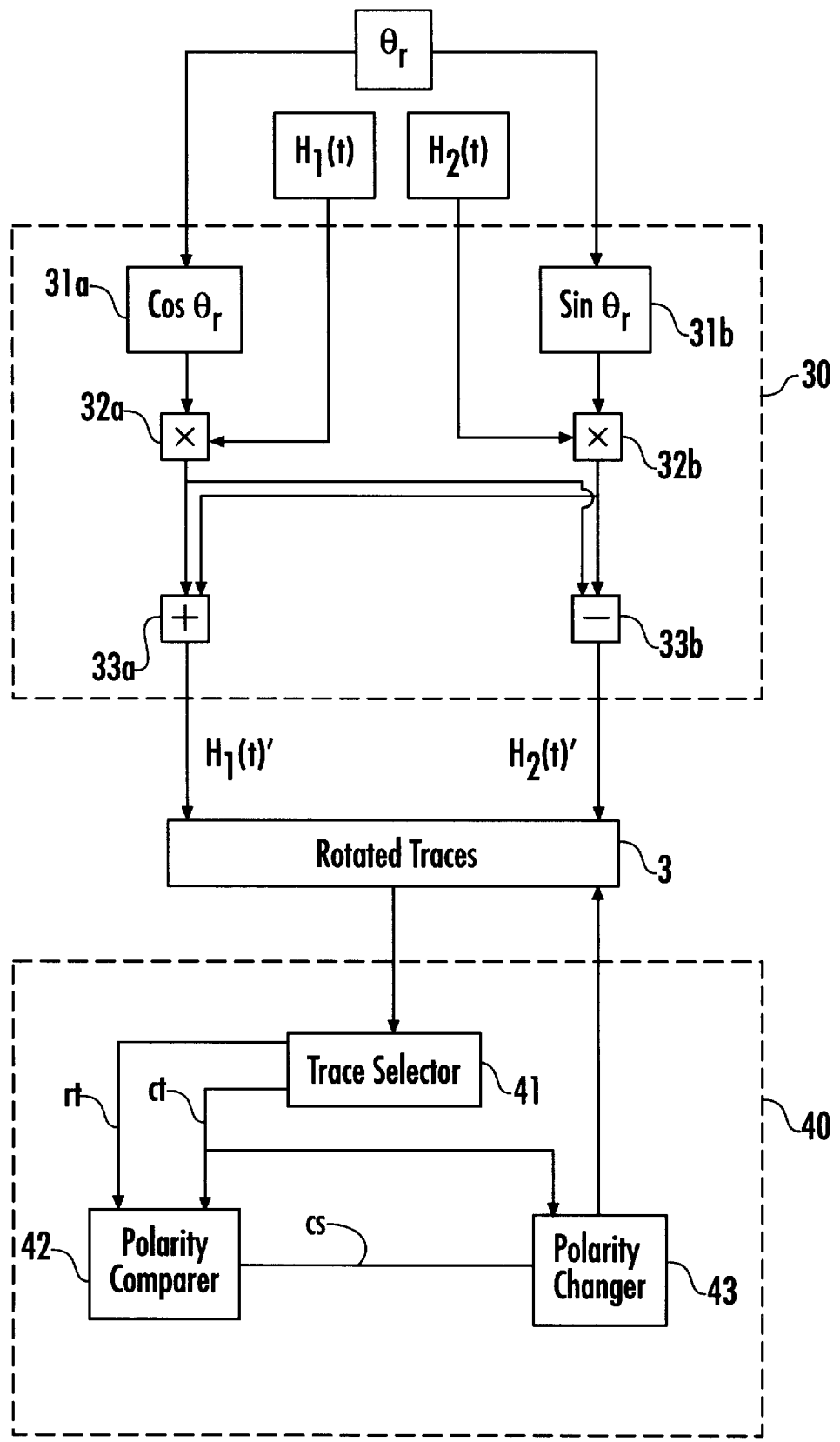
FIG. 6 is a block diagram of an example embodiment of the present invention.

Referring now to FIG. 6A, example embodiments of trace rotator 30 will be described. According to this example, trace rotator 30 has as its input, θr, and traces H1(t) and H2(t). Through cosine component 31a and sine component 31b, the cosine and sine of θr is taken, which are then multiplied to H1(t) and H2(t) respectively by multipliers 32a and 32b. Further, the sine and cosine of θr are taken and multiplied to H1(t) and H2(t), respectively, by multipliers 32c and 32d. It should be noted that, while multipliers 32a and 32b are shown in parallel, in alternative embodiments, one multiplier is used. Further, with respect to the cosine and sine components 31a and 31b, in alternative embodiments different components are used. Such components, whether software, hardware, or some combination of both, are known to those of skill in the art.

Referring again to the embodiment shown in FIG. 6A, the results of the multiplication by multipliers 32a and 32b are summed (by summer 33a) and subtracted (by subtractor 33b), resulting in rotated traces H'(t) (the result of the sum) and H2'(t) (the result of the subtraction). H1'(t) and H2'(t), the rotated traces, are stored in memory 3. Again, the addition and subtraction are seen in parallel. However, in an alternative embodiment, the summing and subtracting are performed by a single addition component. Again, such components, whether software, hardware, or some combination of both, are known to those of skill in the art.

Referring now to FIG. 6B, an example embodiment of uniform polarity adjuster 40 is seen, in which trace selector 41 selects a reference trace rt and comparison trace ct to be compared. An event (for example, the direct arrival) in the two traces is compared by polarity comparer 42 which generates a signal cs to reverse the polarity of comparison trace ct in the event that the polarity of traces rt and ct are not the same. A polarity changer 43 multiplies the comparison trace ct by −1 in the event that signal cs has designated the trace for polarity reversal. As before, the components are known to those of skill in the art.

Figure 7A:
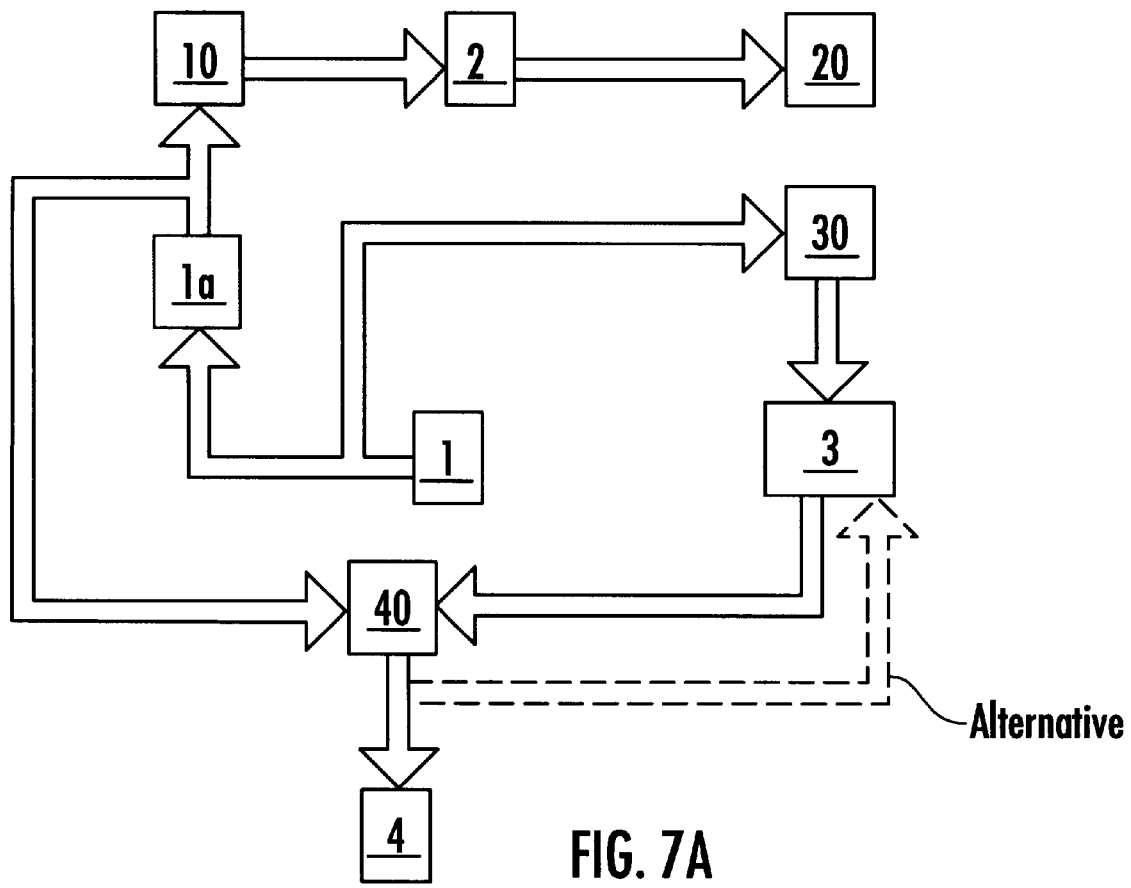
FIGS. 7A and 7B are block diagrams of example embodiments of the present invention.
Figure 7B:
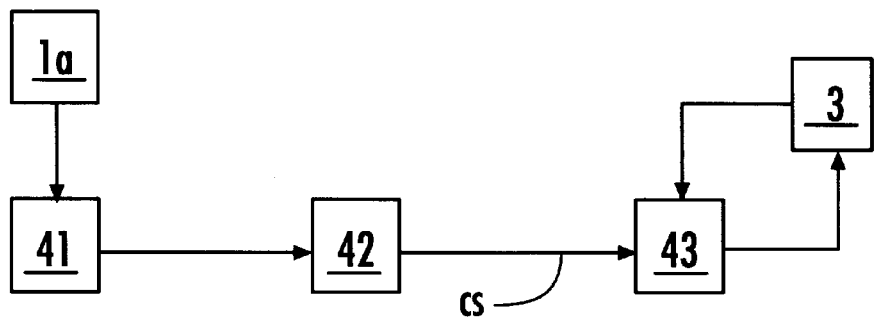

In the embodiment of FIG. 6B, the changed trace is then written back into memory 3, over the original trace. According to an alternative embodiment, however, (see FIG. 7A) memory 3, which contains the entire trace, is not used by trace selector 41. Rather, another memory 1a is used, which holds only the samples of a sample window of a comparison event (e.g. the direct arrival), and polarity changer 43 operates on the entire trace from another memory location (e.g. memory 3), as seen in FIG. 7B.

Referring again to FIG. 5, an example embodiment of azimuth adjustment component 22 is like trace rotator 30 (FIG. 6), with the exception that the input is changed from θr to the angle between a line between the receiver R and the source. In fact, according to some embodiments, the same component as used for trace rotator 30 is used.

Referring still to FIG. 5, examples of statistical analysis component 24 include processes and components programmed to perform those processes such as described above with respect to the method embodiment of the present invention.

Further embodiments of the invention will occur to those of skill in the art which do not depart from its spirit and are intended as being within the scope of the present invention.

What is claimed is:

1. A method of processing seismic data collected with a plurality of multi-component detectors comprising:

determining orientation angles of a first component of a first multi-component detector with respect to a multiple sources;

assigning a receiver orientation angle of the first component based upon said determining the orientation of the first component with respect to the multiple sources by:

adjusting the orientation of the orientation angle of the first component with respect to the sources by amounts equal to the difference in angle of a reference line of known orientation and a line between the source and the receiver, wherein a plurality of adjusted orientation angles of the component with respect to the sources is defined, statistically comparing the adjusted orientation angles of the first component with respect to the sources, and assigning a receiver orientation angle to the first component based upon said statistically comparing;

rotating traces from the first component based on said assigning a receiver orientation angle, wherein a first set of rotated traces are defined; and assigning a uniform polarity to the first set of rotated traces;

rotating traces from a second component based on said assigning a receiver orientation angle, wherein a second set of rotated traces are defined;

assigning a uniform polarity to second set of rotated traces;

wherein said rotating traces from the first component based on said assigning a receiver orientation angle comprises:

multiplying a trace from the first component by the cosine of the orientation angle, wherein a first product is defined, multiplying a trace from the second component of the receiver by the sine of the orientation angle, wherein a second product is defined, and adding the first and the second product, wherein a rotated first trace is defined; and said rotating traces from the second component based on said assigning a receiver orientation angle comprises:

multiplying a trace from the first component by the sine of the orientation angle, wherein a third product is defined, multiplying a trace from the second component of the receiver by the cosine of the orientation angle, wherein a fourth product is defined, and subtracting the third product from the fourth product, wherein a rotated second trace is defined and wherein said assigning a uniform polarity to the rotated set of traces comprises:

comparing the polarity of a first trace of the first set of rotated traces at an event to the polarity of a second trace of the first set of rotated traces at the event, and changing the polarity of the event in the second trace of the first set of rotated traces is different from the polarity of the event in the first trace of the first set of rotated traces.

2. A method of determining the orientation of a multi-component detector using data from a multi-component seismic survey, wherein a first component of the multiple velocity component is oriented in a first direction and a second of the multiple velocity components is oriented in a second direction, the method comprising:

determining the orientation angle of the first component with respect to a first source signal in the survey;

determining the orientation angle of the first component with respect to a second source signal in the survey; and assigning a receiver orientation angle of the first component based upon said determining the orientation of the first component with respect to the first source and upon said determining the orientation of the first component with respect to the second source.

3. A method as in claim 2, wherein said assigning comprises:

adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined, statistically comparing the adjusted orientation angle and the angle of the first component with respect to the first source signal, and assigning a receiver orientation angle of the first component dependant upon said statistical comparing.

4. A method as in claim 3 wherein said statistically comparing comprises averaging of the adjusted orientation angle and the angle of the first component with respect to the first source signal.

5. A method as in claim 2, further comprising determining the orientation angle of the first component with respect to a third source signal in the survey, and wherein said assigning a receiver orientation angle of the first component is further based upon said determining the orientation of the first component with respect to the third source.

6. A method as in claim 5 wherein said assigning farther comprises:

adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined, adjusting the orientation of the orientation angle of the first component with respect to the third source signal by an amount equal to the difference in angle of a line between the first source and the receiver and a line between the third source and the receiver, wherein an adjusted orientation angle of the first component with respect to the third source is defined, statistically comparing the adjusted orientation angle of the first component with respect to the second source, the adjusted orientation angle of the first component with respect to the third source, and the angle of the first component with respect to the first source signal, and assigning a receiver orientation angle to the first component based upon said statistically comparing.

7. A method as in claim 6 wherein:

said statistically comparing comprises averaging of the adjusted orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning the average.

8. A method as in claim 6 wherein said statistically comparing comprises taking the mean of the adjusted orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning the mean.

9. A method as in claim 6 wherein said statistically comparing comprises determining a least squares fit of the orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning the least squares fit.

10. A method as in claim 6 wherein said statistically comparing comprises determining a statistical distribution of the orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning a statistically significant value of the statistical distribution.

11. A method as in claims 10 wherein said statistical distribution comprises a Gaussian distribution.

12. A method as in claim 2 wherein said determining the orientation angle of the first component with respect to a first source comprises application of a hodogram to data points taken from the first component.

13. A method as in claim 2 wherein said determining the orientation angle of the first component with respect to a first source comprises determining an orientation angle at which the sum of the energy detected at the first component and the energy detected at the second component is at a maximum;

assigning an orientation angle of the first component dependent upon the determination of the orientation angle at which the sum is at a maximum.

14. A method as in claim 2 wherein said determining an orientation angle at which the sum of the energy detected at the first component and the energy detected at the second component is at a maximum comprises:

sampling an event in a data trace from the first component;

sampling the event in a data trace from the second component;

changing the sample in the data trace from the first component based upon a first sample angle of rotation, wherein a first angle-adjusted sample of the event from the data trace from the first component is defined;

changing the sample in the data trace from the second component based upon a first sample angle of rotation, wherein a first angle-adjusted sample of the event from the data trace from the second component is defined;

adding the first angle-adjusted sample of the event from the data traces from the first and the second components, wherein a sample energy value is defined for the first sample angle of rotation;

repeating said sampling, changing and adding steps for a plurality of samples of the event from the first and the second components, wherein a set of sample energy values are defined for a plurality of samples of the event;

adding the set of sample energy values, wherein an energy value for the event at the first sample angle of rotation;

repeating said sampling, changing, adding, and repeating steps for a plurality of sample angles of rotation, wherein a set of energy values is defined for a set of sample angles; and determining the sampling angle corresponding to the highest energy value of the set of energy values.

15. A method as in claim 14 wherein said determining the sample angle corresponding to the highest energy value of the set of energy values comprises determination of the point at which the derivative of the energy with respect to the angle reaches zero.

16. A method as in claim 14 wherein said determining the sample angle corresponding to the highest energy value of the set of energy values comprises sorting the set of energy values, wherein a highest energy value is defined and picking the angle associated with the highest energy value.

17. A method as in claim 2 wherein said determining an orientation angle at which the sum of the energy detected at the first component and the energy detected at the second component is at a maximum comprises:

sampling an event in a data trace from the first component, wherein a first time sample value of the event from the first component is defined;

sampling the event in a data trace from the second component, wherein a first time sample value of the event from the second component is defined;

multiplying the first and the second time sample values, wherein a product of the first time sample values of the event from the first and the second component is defined;

squaring the first time sample value of the event from the first component, wherein a squared first time sample value of the event from the first component is defined;

squaring the first time sample value of the event from the second component, wherein a squared first time sample value of the event from the second component is defined;

subtracting the squared first time sample value of the event from the second component from the squared first time sample value of the event from the first component, wherein a difference of squares sample value of the event is defined;

repeating said sampling, multiplying, and subtracting steps for a set of time samples of the event, wherein
a set of difference of squares sample values of the event is defined, and
a set of product of the first time sample values of the event from the first and the second component is defined;

dividing twice the sum of the set of product of the first time sample values of the event from the first and the second component by the sum of the set of difference of squares sample values of the event, wherein an angle value is defined; and dividing the arctangent of the angle value by two, wherein the angle at which the energy is at a maximum is defined.

18. A method of processing seismic data collected with a plurality of multi-component detectors comprising:

determining the orientation angle of the first component of a first multi-component detector with respect to a first source signal in the survey;

determining the orientation angle of the first component with respect to a second source signal in the survey;

assigning a receiver orientation angle of the first component based upon said determining the orientation of the first component with respect to the first source and upon said determining the orientation of the first component with respect to the second source;

rotating traces from the first component based on said assigning a receiver orientation angle, wherein a first set of rotated traces are defined; and assigning a uniform polarity to the first set of rotated traces.

19. A method as in claim 18, wherein said assigning a receiver orientation angle of the first component comprises:

adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined, statistically comparing the adjusted orientation angle and the angle of the first component with respect to the first source signal, and assigning a receiver orientation angle of the first component dependent upon said statistical comparing.

20. A method as in claim 19 wherein said statistically comparing comprises averaging of the adjusted orientation angle and the angle of the first component with respect to the first source signal.

21. A method as in claim 18, further comprising determining the orientation angle of the first component with respect to a third source signal in the survey, and wherein said assigning a receiver orientation angle of the first component is further based upon said determining the orientation of the first component with respect to the third source.

22. A method as in claim 21 wherein said assigning a receiver orientation angle of the first component further comprises:

adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined, adjusting the orientation of the orientation angle of the first component with respect to the third source signal by an amount equal to the difference in angle of a line between the first source and the receiver and a line between the third source and the receiver, wherein an adjusted orientation angle of the first component with respect to the third source is defined, statistically comparing the adjusted orientation angle of the first component with respect to the second source, the adjusted orientation angle of the first component with respect to the third source, and the angle of the first component with respect to the first source signal, and assigning a receiver orientation angle to the first component based upon said statistically comparing.

23. A method as in claim 22 wherein:

said statistically comparing comprises averaging of the adjusted orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning the average.

24. A method as in claim 22 wherein said statistically comparing comprises taking the mean of the adjusted orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning the mean.

25. A method as in claim 22 wherein said statistically comparing comprises determining a least squares fit of the orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning the least squares fit.

26. A method as in claim 22 wherein said statistically comparing comprises determining a statistical distribution of the orientation angle of the first component with respect to the second source, the adjusted orientation angle of the first component with respect to the third source, and the angle of the first component with respect to the first source signal, and said assigning a receiver orientation angle to the first component based upon said statistically comparing comprises assigning a statistically significant value of the statistical distribution.

27. A method as in claims 26 wherein said statistical distribution comprises a Gaussian distribution.

28. A method as in claim 18 wherein said determining the orientation angle of the first component with respect to a first source comprises application of a hodogram to data points taken from the first component.

29. A method as in claim 18 wherein said determining the orientation angle of the first component with respect to a first source comprises determining an orientation angle at which the sum of the energy detected at the first component and the energy detected at the second component is at a maximum;

assigning an orientation angle of the first component dependant upon the determination of the orientation angle at which the sum is at a maximum.

30. A method as in claim 18 wherein said determining an orientation angle at which the sum of the energy detected at the first component and the energy detected at the second component is at a maximum comprises:

sampling an event in a data trace from the first component;

sampling the event in a data trace from the second component;

changing the sample in the data trace from the first component based upon a first sample angle of rotation, wherein a first angle-adjusted sample of the event from the data trace from the first component is defined;

changing the sample in the data trace from the second component based upon a first sample angle of rotation, wherein a first angle-adjusted sample of the event from the data trace from the second component is defined;

adding the first angle-adjusted sample of the event from the data traces from the first and the second components, wherein a sample energy value is defined for the first sample angle of rotation;

repeating said sampling, changing and adding steps for a plurality of samples of the event from the first and the second components, wherein a set of sample energy values are defined for a plurality of samples of the event;

adding the set of sample energy values, wherein an energy value for the event at the first sample angle of rotation;

repeating said sampling, changing, adding, and repeating steps for a plurality of sample angles of rotation, wherein a set of energy values is defined for a set of sample angles; and determining the sampling angle corresponding to the highest energy value of the set of energy values.

31. A method as in claim 30 wherein said determining the sample angle corresponding to the highest energy value of the set of energy values comprises determination of the point at which the derivative of the energy with respect to the angle reaches zero.

32. A method as in claim 30 wherein said determining the sample angle corresponding to the highest energy value of the set of energy values comprises sorting the set of energy values, wherein a highest energy value is defined and picking the angle associated with the highest energy value.

33. A method as in claim 18 wherein said determining an orientation angle at which the sum of the energy detected at the first component and the energy detected at the second component is at a maximum comprises:

sampling an event in a data trace from the first component, wherein a first time sample value of the event from the first component is defined;

sampling the event in a data trace from the second component, wherein a first time sample value of the event from the second component is defined;

multiplying the first and the second time sample values, wherein a product of the first time sample values of the event from the first and the second component is defined;

squaring the first time sample value of the event from the first component, wherein a squared first time sample value of the event from the first component is defined;

squaring the first time sample value of the event from the second component, wherein a squared first time sample value of the event from the second component is defined;

subtracting the squared first time sample value of the event from the second component from the squared first time sample value of the event from the first component, wherein a difference of squares sample value of the event is defined;

repeating said sampling, multiplying, and subtracting steps for a set of time samples of the event, wherein a set of difference of squares sample values of the event is defined, and a set of product of the first time sample values of the event from the first and the second component is defined;

dividing twice the sum of the set of product of the first time sample values of the event from the first and the second component by the sum of the set of difference of squares sample values of the event, wherein an angle value is defined; and dividing the arctangent of the angle value by two, wherein the angle at which the energy is at a maximum is defined.

34. A method as in claim 18 wherein said rotating traces from the first component based on said assigning a receiver orientation angle, comprises:

multiplying a trace from the first component by the cosine of the orientation angle, wherein a first product is defined;

multiplying a trace from a second component of the receiver by the sine of the orientation angle, wherein a second product is defined; and adding the first and the second product, wherein a rotated trace is defined.

35. A method as in claim 18 further comprising rotating traces from a second component based on said assigning a receiver orientation angle, wherein a second set of rotated traces are defined; and assigning a uniform polarity to second set of rotated traces.

36. A method as in claim 35 wherein:

said rotating traces from the first component based on said assigning a receiver orientation angle comprises:

multiplying a trace from the first component by the cosine of the orientation angle, wherein a first product is defined, multiplying a trace from the second component of the receiver by the sine of the orientation angle, wherein a second product is defined, and adding the first and the second product, wherein a rotated first trace is defined; and said rotating traces from the second component based on said assigning a receiver orientation angle comprises:

multiplying a trace from the first component by the sine of the orientation angle, wherein a third product is defined, multiplying a trace from the second component of the receiver by the cosine of the orientation angle, wherein a fourth product is defined, and subtracting the third product from the fourth product, wherein a rotated second trace is defined.

37. A method as in claim 18 wherein said assigning a uniform polarity to the rotated set of traces comprises:

comparing the polarity of a first trace of the first set of rotated traces at an event to the polarity of a second trace of the first set of rotated traces at the event, and changing the polarity of the event in the second trace of the first set of rotated traces is different from the polarity of the event in the first trace of the first set of rotated traces.

38. A method as in claim 37 wherein said first trace of the first set of rotated traces is adjacent said second trace of the first set of rotated traces at the event.

39. A method as in claims 37 wherein said event in said first trace comprises a direct arrival.

40. A method as in claim 37 wherein said comparing the polarity of a first trace of the first set of rotated traces at an event to the polarity of a second trace of the first set of rotated traces at the event comprises:

sampling an event window in the first trace, wherein a first trace sample value is defined, sampling an event window in the first trace, wherein a second trace sample value is defined, and multiplying the first trace sample by the second trace sample; and said changing occurs if the result of said multiplying is less than zero.

41. A method as in claim 37 wherein said comparing the polarity of a first trace of the first set of rotated traces at an event to the polarity of a second trace of the first set of rotated traces at the event comprises:

sampling an event window in the first trace, wherein a set of first trace sample values is defined, sampling an event window in the first trace, wherein a set of second trace sample values is defined, the members of the set of second trace sample values corresponding to the members of the set of first trace sample values, and multiplying corresponding first trace sample values and second trace sample values, wherein a set of products of corresponding first and second trace sample values is defined; and said changing occurs if more of the products of the set of products are negative than positive.

42. A method as in claim 37 wherein said first trace and said second trace are from receivers in a common cable.

43. A method as in claim 37 wherein said first trace and said second trace are from receivers in different cables.

44. A method of processing seismic data collected with a plurality of multi-component detectors comprising:

determining the orientation angle of a horizontal component, rotating traces from the first component based on said determining, and matching the polarity of a reference trace and another trace from the first component, based on a cross-correlation of the reference trace and the other trace.

45. A method as in claim 44 wherein said determining comprises determining the orientation angle of the horizontal component from a single source.

46. A method as in claim 44 wherein said determining comprises:

determining the orientation angle of the first component with respect to a first source signal in the survey; and determining the orientation angle of the first component with respect to a second source signal in the survey.

47. A system for determining the orientation of a multi-component detector using data from a multi-component seismic survey, wherein a first component of the multiple velocity component is oriented in a first direction and a second of the multiple velocity components is oriented in a second direction, the system comprising:

means for determining the orientation angle of the first component with respect to a first source signal in the survey;

means for determining the orientation angle of the first component with respect to a second source signal in the survey; and means for assigning a receiver orientation angle of the first component based upon said determining the orientation of the first component with respect to the first source and upon said determining the orientation of the first component with respect to the second source.

48. A system as in claim 47, wherein said means for assigning comprises:

means for adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined, means for statistically comparing the adjusted orientation angle and the angle of the first component with respect to the first source signal, and means for assigning a receiver orientation angle of the first component dependent upon said statistical comparing.

49. A system as in claim 48 wherein said means for statistically comparing comprises means for averaging of the adjusted orientation angle and the angle of the first component with respect to the first source signal.

50. A system as in claim 47, further comprising means for determining the orientation angle of the first component with respect to a third source signal in the survey, and wherein said means for assigning a receiver orientation angle of the first component is further based upon said determining the orientation of the first component with respect to the third source.

51. A system as in claim 50 wherein said means for assigning further comprises:

means for adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined, means for adjusting the orientation of the orientation angle of the first component with respect to the third source signal by an amount equal to the difference in angle of a line between the first source and the receiver and a line between the third source and the receiver, wherein an adjusted orientation angle of the first component with respect to the third source is defined, means for statistically comparing the adjusted orientation angle of the first component with respect to the second source, the adjusted orientation angle of the first component with respect to the third source, and the angle of the first component with respect to the first source signal, and means for assigning a receiver orientation angle to the first component based upon said statistically comparing.

52. A system as in claim 51 wherein:

said means for statistically comparing comprises means for averaging of the adjusted orientation angle of the first component with respect to the second source, the adjusted orientation angle of the first component with respect to the third source, and the angle of the first component with respect to the first source signal, and said means for assigning a receiver orientation angle to the first component based upon said statistically comparing comprises assigning the average.

53. A system as in claim 51 wherein said means for statistically comparing comprises means for taking the mean of the adjusted orientation angle of the first component with respect to the second source, the adjusted orientation angle of the first component with respect to the third source, and the angle of the first component with respect to the first source signal, and said means for assigning a receiver orientation angle to the first component based upon said statistically comparing comprises means for assigning the mean.

54. A system as in claim 51 wherein said means for statistically comparing comprises means for determining a least squares fit of the orientation angle of the first component with respect to the second source, the adjusted orientation angle of the first component with respect to the third source, and the angle of the first component with respect to the first source signal, and said means for assigning a receiver orientation angle to the first component based upon said statistically comparing comprises means for assigning the least squares fit.

55. A system as in claim 51 wherein said means for statistically comparing comprises means for determining a statistical distribution of the orientation angle of the first component with respect to the second source, the adjusted orientation angle of the first component with respect to the third source, and the angle of the first component with respect to the first source signal, and said means for assigning a receiver orientation angle to the first component based upon said statistically comparing comprises means for assigning a statistically significant value of the statistical distribution.

56. A system as in claim 55 wherein said means for statistical distribution comprises a Gaussian distribution.

57. A system as in claim 47 wherein said means for determining the orientation angle of the first component with respect to a first source comprises means for application of a hodogram to data points taken from the first component.

58. A system as in claim 47 wherein said means for determining the orientation angle of the first component with respect to a first source comprises means for determining an orientation angle at which the sum of the energy detected at the first component and the energy detected at the second component is at a maximum;

means for assigning an orientation angle of the first component dependent upon the determination of the orientation angle at which the sum is at a maximum.

59. A system as in claim 47 wherein said means for determining an orientation angle at which the sum of the energy detected at the first component and the energy detected at the second component is at a maximum comprises:

means for sampling an event in a data trace from the first component;

means for sampling the event in a data trace from the second component;

means for changing the sample in the data trace from the first component based upon a first sample angle of rotation, wherein a first angle-adjusted sample of the event from the data trace from the first component is defined;

means for changing the sample in the data trace from the second component based upon a first sample angle of rotation, wherein a first angle-adjusted sample of the event from the data trace from the second component is defined;

means for adding the first angle-adjusted sample of the event from the data traces from the first and the second components, wherein a sample energy value is defined for the first sample angle of rotation;

means for repeating said sampling, changing and adding steps for a plurality of samples of the event from the first and the second components, wherein a set of sample energy values are defined for a plurality of samples of the event;

means for adding the set of sample energy values, wherein an energy value for the event at the first sample angle of rotation;

means for repeating said sampling, changing, adding, and repeating steps for a plurality of sample angles of rotation, wherein a set of energy values is defined for a set of sample angles; and means for determining the sampling angle corresponding to the highest energy value of the set of energy values.

60. A system as in claim 59 wherein said means for determining the sample angle corresponding to the highest energy value of the set of energy values comprises means for determining the point at which the derivative of the energy with respect to the angle reaches zero.

61. A system as in claim 59 wherein said means for determining the sample angle corresponding to the highest energy value of the set of energy values comprises means for sorting the set of energy values, wherein a highest energy value is defined and picking the angle associated with the highest energy value.

62. A system as in claim 47 wherein said means for determining an orientation angle at which the sum of the energy detected at the first component and the energy detected at the second component is at a maximum comprises:

means for sampling an event in a data trace from the first component, wherein a first time sample value of the event from the first component is defined;

means for sampling the event in a data trace from the second component, wherein a first time sample value of the event from the second component is defined;

means for multiplying the first and the second time sample values, wherein a product of the first time sample values of the event from the first and the second component is defined;

means for squaring the first time sample value of the event from the first component, wherein a squared first time sample value of the event from the first component is defined;

means for squaring the first time sample value of the event from the second component, wherein a squared first time sample value of the event from the second component is defined;

means for subtracting the squared first time sample value of the event from the second component from the squared first time sample value of the event from the first component, wherein a difference of squares sample value of the event is defined;

means for repeating said sampling, multiplying, and subtracting steps for a set of time samples of the event, wherein a set of difference of squares sample values of the event is defined, and a set of product of the first time sample values of the event from the first and the second component is defined;

means for dividing twice the sum of the set of product of the first time sample values of the event from the first and the second component by the sum of the set of difference of squares sample values of the event, wherein an angle value is defined; and means for dividing the arctangent of the angle value by two, wherein the angle at which the energy is at a maximum is defined.

63. A system of processing seismic data collected with a plurality of multi-component detectors comprising:

means for determining the orientation angle of the first component of a first multicomponent detector with respect to a first source signal in the survey;

means for determining the orientation angle of the first component with respect to a second source signal in the survey;

means for assigning a receiver orientation angle of the first component based upon said determining the orientation of the first component with respect to the first source and upon said determining the orientation of the first component with respect to the second source;

means for rotating traces from the first component based on said assigning a receiver orientation angle, wherein a first set of rotated traces are defined; and means for assigning a uniform polarity to the first set of rotated traces.

64. A system as in claim 63, wherein said means for assigning a receiver orientation angle of the first component comprises:

means for adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined, means for statistically comparing the adjusted orientation angle and the angle of the first component with respect to the first source signal, and means for assigning a receiver orientation angle of the first component dependant upon said statistical comparing.

65. A system as in claim 64 wherein said means for statistically comparing comprises means for averaging of the adjusted orientation angle and the angle of the first component with respect to the first source signal.

66. A system as in claim 63, further comprising means for determining the orientation angle of the first component with respect to a third source signal in the survey, and wherein said assigning a receiver orientation angle of the first component is further based upon said determining the orientation of the first component with respect to the third source.

67. A system as in claim 66 wherein said means for assigning a receiver orientation angle of the first component further comprises:

means for adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined, means for adjusting the orientation of the orientation angle of the first component with respect to the third source signal by an amount equal to the difference in angle of a line between the first source and the receiver and a line between the third source and the receiver, wherein an adjusted orientation angle of the first component with respect to the third source is defined, means for statistically comparing the adjusted orientation angle of the first component with respect to the second source, the adjusted orientation angle of the first component with respect to the third source, and the angle of the first component with respect to the first source signal, and means for assigning a receiver orientation angle to the first component based upon said statistically comparing.

68. A system as in claim 67 wherein:

said means for statistically comparing comprises averaging of the adjusted orientation angle of the first component with respect to the second source, the adjusted orientation angle of the first component with respect to the third source, and the angle of the first component with respect to the first source signal, and said means for assigning a receiver orientation angle to the first component based upon said statistically comparing comprises assigning the average.

69. A system as in claim 67 wherein said means for statistically comparing comprises means for taking the mean of the adjusted orientation angle of the first component with respect to the second source, the adjusted orientation angle of the first component with respect to the third source, and the angle of the first component with respect to the first source signal, and said means for assigning a receiver orientation angle to the first component based upon said statistically comparing comprises assigning the mean.

70. A system as in claim 67 wherein said means for statistically comparing comprises means for determining a least squares fit of the orientation angle of the first component with respect to the second source, the adjusted orientation angle of the first component with respect to the third source, and the angle of the first component with respect to the first source signal, and said means for assigning a receiver orientation angle to the first component based upon said statistically comparing comprises assigning the least squares fit.

71. A system as in claim 67 wherein said means for statistically comparing comprises means for determining a statistical distribution of the orientation angle of the first component with respect to the second source, the adjusted orientation angle of the first component with respect to the third source, and the angle of the first component with respect to the first source signal, and said means for assigning a receiver orientation angle to the first component based upon said statistically comparing comprises assigning a statistically significant value of the statistical distribution.

72. A system as in claim 71 wherein said means for statistical distribution comprises a Gaussian distribution.

73. A system as in claim 63 wherein said means for determining the orientation angle of the first component with respect to a first source comprises means for application of a hodogram to data points taken from the first component.

74. A system as in claim 63 wherein said means for determining the orientation angle of the first component with respect to a first source comprises means for determining an orientation angle at which the sum of the energy detected at the first component and the energy detected at the second component is at a maximum;

means for assigning an orientation angle of the first component dependant upon the determination of the orientation angle at which the sum is at a maximum.

75. A system as in claim 63 wherein said means for determining an orientation angle at which the sum of the energy detected at the first component and the energy detected at the second component is at a maximum comprises:

means for sampling an event in a data trace from the first component;

means for sampling the event in a data trace from the second component;

means for changing the sample in the data trace from the first component based upon a first sample angle of rotation, wherein a first angle-adjusted sample of the event from the data trace from the first component is defined;

means for changing the sample in the data trace from the second component based upon a first sample angle of rotation, wherein a first angle-adjusted sample of the event from the data trace from the second component is defined;

means for adding the first angle-adjusted sample of the event from the data traces from the first and the second components, wherein a sample energy value is defined for the first sample angle of rotation;

means for repeating said sampling, changing and adding steps for a plurality of samples of the event from the first and the second components, wherein a set of sample energy values are defined for a plurality of samples of the event;

means for adding the set of sample energy values, wherein an energy value for the event at the first sample angle of rotation;

means for repeating said sampling, changing, adding, and repeating steps for a plurality of sample angles of rotation, wherein a set of energy values is defined for a set of sample angles; and means for determining the sampling angle corresponding to the highest energy value of the set of energy values.

76. A system as in claim 75 wherein said means for determining the sample angle corresponding to the highest energy value of the set of energy values comprises means for determination of the point at which the derivative of the energy with respect to the angle reaches zero.

77. A system as in claim 75 wherein said means for determining the sample angle corresponding to the highest energy value of the set of energy values comprises means for sorting the set of energy values, wherein a highest energy value is defined and picking the angle associated with the highest energy value.

78. A system as in claim 63 wherein said means for determining an orientation angle at which the sum of the energy detected at the first component and the energy detected at the second component is at a maximum comprises:

means for sampling an event in a data trace from the first component, wherein a first time sample value of the event from the first component is defined;

means for sampling the event in a data trace from the second component, wherein a first time sample value of the event from the second component is defined;

means for multiplying the first and the second time sample values, wherein a product of the first time sample values of the event from the first and the second component is defined;

means for squaring the first time sample value of the event from the first component, wherein a squared first time sample value of the event from the first component is defined;

means for squaring the first time sample value of the event from the second component, wherein a squared first time sample value of the event from the second component is defined;

means for subtracting the squared first time sample value of the event from the second component from the squared first time sample value of the event from the first component, wherein a difference of squares sample value of the event is defined;

means for repeating said sampling, multiplying, and subtracting steps for a set of time samples of the event, wherein a set of difference of squares sample values of the event is defined, and a set of product of the first time sample values of the event from the first and the second component is defined;

means for dividing twice the sum of the set of product of the first time sample values of the event from the first and the second component by the sum of the set of difference of squares sample values of the event, wherein an angle value is defined; and means for dividing the arctangent of the angle value by two, wherein the angle at which the energy is at a maximum is defined.

79. A system as in claim 63 wherein said rotating traces from the first component based on said assigning a receiver orientation angle, comprises:

means for multiplying a trace from the first component by the cosine of the orientation angle, wherein a first product is defined;

means for multiplying a trace from a second component of the receiver by the sine of the orientation angle, wherein a second product is defined; and means for adding the first and the second product, wherein a rotated trace is defined.

80. A system as in claim 63 further comprising means for rotating traces from a second component based on said assigning a receiver orientation angle, wherein a second set of rotated traces are defined; and means for assigning a uniform polarity to second set of rotated traces.

81. A system as in claim 80 wherein:

said means for rotating traces from the first component based on said assigning a receiver orientation angle comprises:

multiplying a trace from the first component by the cosine of the orientation angle, wherein a first product is defined, means for multiplying a trace from the second component of the receiver by the sine of the orientation angle, wherein a second product is defined, and means for adding the first and the second product, wherein a rotated first trace is defined; and said means for rotating traces from the second component based on said assigning a receiver orientation angle comprises:

means for multiplying a trace from the first component by the sine of the orientation angle, wherein a third product is defined, means for multiplying a trace from the second component of the receiver by the cosine of the orientation angle, wherein a fourth product is defined, and means for subtracting the third product from the fourth product, wherein a rotated second trace is defined.

82. A system as in claim 63 wherein said means for assigning a uniform polarity to the rotated set of traces comprises:

means for comparing the polarity of a first trace of the first set of rotated traces at an event to the polarity of a second trace of the first set of rotated traces at the event means for changing the polarity of the event in the second trace of the first set of rotated traces is different from the polarity of the event in the first trace of the first set of rotated traces.

83. A system as in claim 82 wherein said first trace of the first set of rotated traces is adjacent said second trace of the first set of rotated traces at the event.

84. A system as in claim 82 wherein said event in said first trace comprises a direct arrival.

85. A system as in claim 82 wherein said means for comparing the polarity of a first trace of the first set of rotated traces at an event to the polarity of a second trace of the first set of rotated traces at the event comprises:
means for sampling an event window in the first trace, wherein a first trace sample value is defined,
means for sampling an event window in the first trace, wherein a second trace sample value is defined, and
means for multiplying the first trace sample by the second trace sample; and said changing occurs if the result of said multiplying is less than zero.

86. A system as in claim 82 wherein said means for comparing the polarity of a first trace of the first set of rotated traces at an event to the polarity of a second trace of the first set of rotated traces at the event comprises:
means for sampling an event window in the first trace, wherein a set of first trace sample values is defined,
means for sampling an event window in the first trace, wherein a set of second trace sample values is defined, the members of the set of second trace sample values corresponding to the members of the set of first trace sample values, and
means for multiplying corresponding first trace sample values and second trace sample values, wherein a set of products of corresponding first and second trace sample values is defined; and
said changing occurs if more of the products of the set of products are negative than positive.

87. A system as in claim 82 wherein said first trace and said second trace are from receivers in a common cable.

88. A system as in claim 82 wherein said first trace and said second trace are from receivers in different cables.

89. A system of processing seismic data collected with a plurality of multi-component detectors comprising:
means for determining the orientation angle of the first component of a first multi-component detector with respect to a first source signal in the survey;
means for determining the orientation angle of the first component with respect to a second source signal in the survey;
means for assigning a receiver orientation angle of the first component based upon said determining the orientation of the first component with respect to the first source and upon said determining the orientation of the first component with respect to the second source;
means for rotating traces from the first component based on said assigning a receiver orientation angle, wherein a first set of rotated traces are defined; and
means for assigning a uniform polarity to the first set of rotated traces;
means for determining the orientation angle of the first component with respect to a third source signal in the survey, and wherein said assigning a receiver orientation angle of the first component is further based upon said determining the orientation of the first component with respect to the third source;
wherein said means for assigning a receiver orientation angle of the first component further comprises:
means for adjusting the orientation of the orientation angle of the first component with respect to the second source signal by an amount equal to the difference in angle of a line between the first source and the receiver and a line between the second source and the receiver, wherein an adjusted orientation angle of the first component with respect to the second source is defined,
means for adjusting the orientation of the orientation angle of the first component with respect to the third source signal by an amount equal to the difference in angle of a line between the first source and the receiver and a line between the third source and the receiver, wherein an adjusted orientation angle of the first component with respect to the third source is defined,
means for statistically comparing the adjusted orientation angle of the first component with respect to the second source, the adjusted orientation angle of the first component with respect to the third source, and the angle of the first component with respect to the first source signal, and
means for assigning a receiver orientation angle to the first component based upon said statistically comparing;
wherein said means for statistically comparing comprises means for determining a statistical distribution of the orientation angle of the first component with respect to:
the second source,
the adjusted orientation angle of the first component with respect to the third source, and
the angle of the first component with respect to the first source signal; and
wherein said means for assigning a receiver orientation angle to the first component based upon said statistically comparing comprises assigning a statistically significant value of the statistical distribution;
and further comprising:
means for rotating traces from a second component based on said assigning a receiver orientation angle, wherein a second set of rotated traces are defined;
means for assigning a uniform polarity to second set of rotated traces;
wherein said means for rotating traces from the first component based on said assigning a receiver orientation angle comprises:
means for multiplying a trace from the first component by the cosine of the orientation angle, wherein a first product is defined,
means for multiplying a trace from the second component of the receiver by the sine of the orientation angle, wherein a second product is defined, and
means for adding the first and the second product, wherein a rotated first trace is defined; and
said means for rotating traces from the second component based on said assigning a receiver orientation angle comprises:
means for multiplying a trace from the first component by the sine of the orientation angle, wherein a third product is defined,
means for multiplying a trace from the second component of the receiver by the cosine of the orientation angle, wherein a fourth product is defined, and
means for subtracting the third product from the fourth product, wherein a rotated second trace is defined
and wherein said means for assigning a uniform polarity to the rotated set of traces comprises:
means for comparing the polarity of a first trace of the first set of rotated traces at an event to the polarity of a second trace of the first set of rotated traces at the event
means for changing the polarity of the event in the second trace of the first set of rotated traces is different from the polarity of the event in the first trace of the first set of rotated traces.

* * * * *

UNITED STATES PATENT AND TRADEMARK OFFICE
CERTIFICATE OF CORRECTION

PATENT NO. : 6,061,298
DATED : May 9, 2000
INVENTOR(S) : Eric Madtson, Jianchao Li, Mehmet Suat Altan and Xianhuai Zhu It is certified that error appears in the above-indentified patent and that said Letters Patent is hereby corrected as shown below:

On the title page, item [56],

In Other Publications, "D. Corigan" should read -- D. Corrigan --

In Column 2, Line 20, "radial" and, "transverse" should read -- "radial" and "transverse" --

In Column 4, Line 21, "component based upon said; statistically" should read -- component based upon said statistically --

In Column 15, Line 53, "doubler. 19" should read -- doubler 19 --

In Column 16, Line 4, "3 la" should read -- 31a --

In Claim 6, Line 27, the word "farther" should read -- further --

Signed and Sealed this

Twenty-seventh Day of March, 2001

*Attest:*

NICHOLAS P. GODICI

*Attesting Officer*  *Acting Director of the United States Patent and Trademark Office*